US008898586B2

(12) United States Patent
Sengupta

(10) Patent No.: US 8,898,586 B2
(45) Date of Patent: Nov. 25, 2014

(54) MULTIPLE TOUCHPOINTS FOR EFFICIENT TEXT INPUT

(75) Inventor: Caesar Sengupta, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 816 days.

(21) Appl. No.: 13/113,725

(22) Filed: May 23, 2011

(65) Prior Publication Data
US 2012/0075190 A1 Mar. 29, 2012

Related U.S. Application Data

(60) Provisional application No. 61/386,249, filed on Sep. 24, 2010.

(51) Int. Cl.
G06F 3/048 (2013.01)
G06F 17/27 (2006.01)
G06F 3/0488 (2013.01)

(52) U.S. Cl.
CPC .......... G06F 3/04886 (2013.01); G06F 17/276 (2013.01); G06F 3/04883 (2013.01)
USPC ....................................... 715/773

(58) Field of Classification Search
CPC G06F 3/04883; G06F 17/276; G06F 3/04886
USPC ....................................... 715/773
See application file for complete search history.

(56) References Cited

U.S. PATENT DOCUMENTS

| 4,858,170 | A | * | 8/1989 | DeWick et al. | ............... | 715/201 |
| 4,891,786 | A | | 1/1990 | Goldwasser | | |
| 7,453,439 | B1 | * | 11/2008 | Kushler et al. | ............... | 345/168 |
| 2006/0265648 | A1 | | 11/2006 | Rainisto et al. | | |
| 2007/0286663 | A1 | | 12/2007 | Kinney | | |

FOREIGN PATENT DOCUMENTS

| EP | 0 243 188 | A2 | 10/1987 |
| EP | 0 651 315 | A1 | 5/1995 |
| WO | WO 2005/122401 | A2 | 12/2005 |
| WO | WO 2006/020992 | A2 | 2/2006 |

OTHER PUBLICATIONS

European Patent Office, Notification of Transmittal of the International Search Report and the Written Opinion of the International Searching Authority, or the Declaration, International Search Report, and Written Opinion of the International Searching Authority, mailed Dec. 9, 2011, International Appln. No. PCT/US2011/050369, Filed: Sep. 2, 2011, 12 pages.
TFTS, "Swype and Samsung Omnia II Set Guinness World Record For Texting [World Record of 35.54 Seconds Set By Franklin Page, Immortalized in a Commercial]", http://nexus404.com/Blog/2010/03/23/swype-samsung-omnia-set-guiness-world-record/, dated Mar. 23, 2010, pp. 1 and 2.

* cited by examiner

Primary Examiner — Omar Abdul-Ali
(74) Attorney, Agent, or Firm — Troutman Sanders LLP; James E. Schutz; Christopher W. Glass

(57) ABSTRACT

Methods and systems for using multiple simultaneous touchpoints of a touch-sensitive keyboard, such as an on-screen keyboard, for more efficient text input are provided. A method for generating text using a touch-sensitive keyboard may include receiving touch input from multiple simultaneous touchpoints. The method may also include determining a text character for each respective simultaneous touchpoint based on the touch input. The method may further include generating a text word based on the text characters determined from the multiple simultaneous touchpoints. A system for generating text using a touch-sensitive keyboard may include a touch input receiver, a slide detector and a text word generator.

17 Claims, 8 Drawing Sheets

FIG. 3

MULTIPLE TOUCHPOINTS FOR EFFICIENT TEXT INPUT

CROSS REFERENCE TO RELATED APPLICATIONS

This application claims the benefit of U.S. Provisional Appl. No. 61/386,249, filed Sep. 24, 2010, which is hereby incorporated by reference in its entirety.

TECHNICAL FIELD

The embodiments relate to text input using on-screen keyboards or other touch-sensitive keyboards.

BACKGROUND

Computers, games consoles, monitors, and mobile devices such as cell phones, personal digital assistants (PDAs), navigation devices, smartphones and tablets accept input from touch screens. Some touch screens provide on-screen keyboards, including variations of the QWERTY keyboard. These on-screen keyboards may be used for text entry in small or large amounts. However, text entry can be frustrating. Mobile devices have smaller screens (often no larger than 4 inches) and thus smaller on-screen keyboards. A finger touch may occupy a significant portion of the screen. Text entry usually involves hunting and pecking with a single finger or entering text with one or two thumbs. Larger on-screen keyboards, such as those found on tablets, provide for a more conventional method of typing but usually lack tactile feedback and are more conducive to slides than striking actions. Text entry is inefficient for many users.

Other methods of inputting text are also inefficient. Handwriting recognition takes too long to form a letter compared to typing. Voice recognition is not ideal for many situations. Voice is too public a medium. Also, various accents and surrounding noise make recognition difficult. It is also difficult to port voice recognition technology to multiple languages.

BRIEF SUMMARY

Embodiments described below relate to using multiple simultaneous touchpoints on a touch-sensitive keyboard to enter entire words or concepts in fewer motions, allowing for much more efficient and faster forms of text input. According to an embodiment, a method for generating text using a touch-sensitive keyboard may include receiving touch input from a first plurality of simultaneous touchpoints. The method may also include determining a text character for each respective simultaneous touchpoint based on the touch input. The method may further include generating a text word based on the text characters determined from the first plurality of simultaneous touchpoints.

According to another embodiment, a system for generating text using a touch-sensitive keyboard may include a touch input receiver configured to receive touch input from a first plurality of simultaneous touchpoints. The system may also include a text word generator configured to determine a text character for each respective simultaneous touchpoint based on the touch input and generate a text word based on the text characters determined from the first plurality of simultaneous touchpoints.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 3 illustrates text input using multiple touchpoints, according to an embodiment.

DETAILED DESCRIPTION

Figure 1:
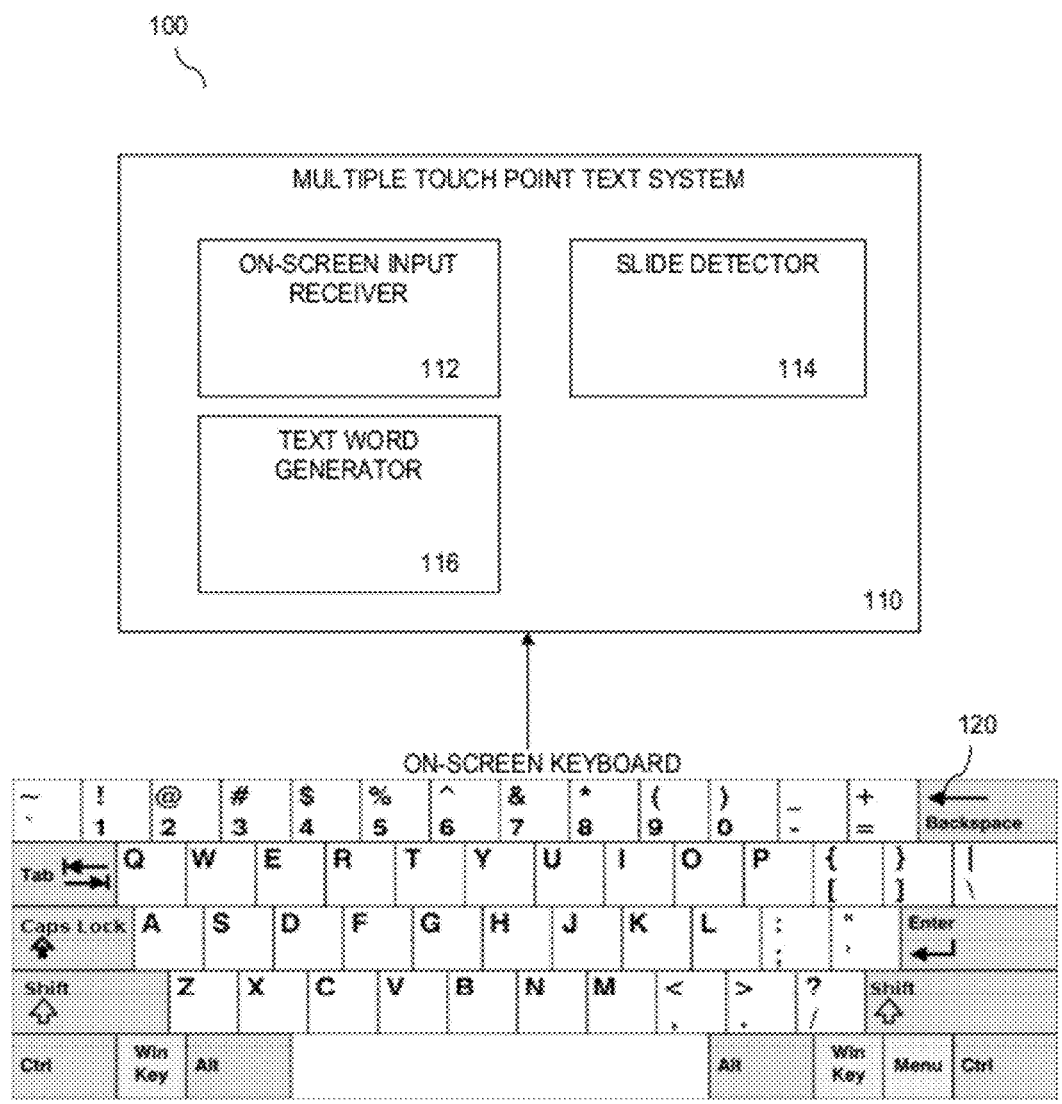
FIG. 1 is a diagram of a multiple touchpoint system, according to an embodiment.

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Text entry using touch sensitive devices, such as on-screen keyboards, can be frustrating. Mobile devices have small keyboards and text entry usually involves hunting and pecking with a single finger or entering text with one or two thumbs. Tablets provide an opportunity for a more conventional method of typing but there is usually no tactile feedback and a touch medium is more conducive to slides than striking actions. Text entry on touch screens is inefficient for many users. When a user is using one finger, there is only one channel of communication at a time and that is always going to be less efficient than using a regular keyboard where a user can use multiple fingers almost simultaneously (the equivalent to having almost 10 channels of communication).

Embodiments of the present invention are directed to using touch surfaces to receive multiple touchpoints simultaneously for text input. These touch surfaces may be on-screen keyboards that are familiar to users. Touch surfaces may also include other types of touch sensitive keyboards or user interface devices. On-screen or other touch-sensitive keyboards may also involve different key layouts. Instead of typing individual letters to form words, users may use multiple fingers (potentially even all 10) to simultaneously touch, slide, stroke or flick multiple text characters to form a text word. The text characters may include letters or any symbols and may be selected by touching an identifiable key (or proximate to a targeted key). The text characters may be used to form text words. Text words may include roman alphabet-based letters. Text words may also be of any language or written form of communication. Text words may include strokes or any other characters or symbols used to form a word, concept or communicative indicator.

Text characters may be determined from multiple simultaneous touchpoints. The multiple touchpoints may also be part of a slide action. A slide action may be detected as a slide indication. A slide indication may include a detected direction and/or speed of the slide. In some cases, a slide may be a quick slide, or a flick. In other cases, a slide may involve multiple touchpoints being brushed or stroked simultaneously. Different types of slides may be indicated by different directions, speeds or patterns. Slide information may be used to identify a set of touchpoints that are considered to be simultaneous. Multiple touchpoints may be considered simultaneous if they are touched, released or slid at approximately the same time, or a time that is considered simultaneous based on the speed and human perception of such activity. Simultaneous may also mean that each touchpoint is being pressed at the same time at some point in time.

FIG. 1 shows an exemplary system 100 for text input using simultaneous multiple touches, according to an embodiment. FIG. 1 shows an on-screen keyboard 120 that provides touch information to multiple touchpoint text system 110. While an on-screen keyboard is used in these embodiments, the embodiments should not be limited to on-screen keyboards. Other touch-sensitive keyboards or devices, such as peripheral or stand-alone touch-sensitive keyboards may be used. Text system 110 may include an on-screen input receiver 112, slide detector 114 and text word generator 116. Text system 110 may be implemented on or implemented with a computing device. For example, text system 110 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s). System 110 may be located on the same or different computing devices.

Multiple touchpoints and slide indications may be used to determine text characters. On-screen input receiver 112 may be configured receive on-screen input from a plurality of simultaneous touchpoints. A user may touch the screen with his or her fingers, or with a device having multiple points. On-screen input receiver 112 may receive this input from any type of touch receiver, such as on-screen keyboard 110, that accepts input from a touch screen. On-screen input may include positions that the user touched as defined by an X and Y coordinate on the screen. On-screen input may also include other information known to be received by such devices, such as information indicating pressure. On-screen input may be information received from any material or device that uses technology known in the art including, but not limited to, resistive, capacitive, infrared, surface acoustic wave, strain gauge, optical imaging, acoustic pulse recognition, frustrated total internal reflection, and diffused laser imaging technologies.

Text word generator 116 may be configured to determine a text character or a set of text characters for each simultaneous touchpoint based on the on-screen input, according to an embodiment. In some cases, text characters are determined by key identification information provided to text word generator 116. Text word generator 116 may also be configured to generate a text word based on the text characters determined from a plurality of simultaneous touchpoints. Text word generator 116 may take the plurality of text characters that are selected and use predictive technologies to form words.

Slide detector 114 may be configured to receive a slide indication of a slide of a plurality of simultaneous touchpoints, according to an embodiment. Text word generator 116 may be configured to determine a text character for each respective simultaneous touchpoint based on the on-screen input and the slide indication. In many embodiments, a slide indication is used to identify touchpoints that are considered simultaneous with other touchpoints.

According to a further embodiment, on-screen input receiver 112 may receive multiple pluralities of simultaneous touchpoints. Slide detector 114 may also receive a slide indication for these other pluralities of simultaneous touchpoints. Text word generator 116 may receive on-screen input and slide indications from multiple pluralities of simultaneous touchpoints and generate a text word based on the text characters determined from the multiple pluralities of simultaneous touchpoints.

Text words may be generated from text characters that make up the text word, according to an embodiment. In some cases, a text word may be determined from a fewer number of text characters than what is necessary to spell the text word. In other cases, a first set of characters may include text characters of a first portion of a text word and a second set of characters may include text characters of a second portion of a text word. Two sets of characters may be used to determine a longer text word or help to narrow possible choices of text words.

Figure 2:
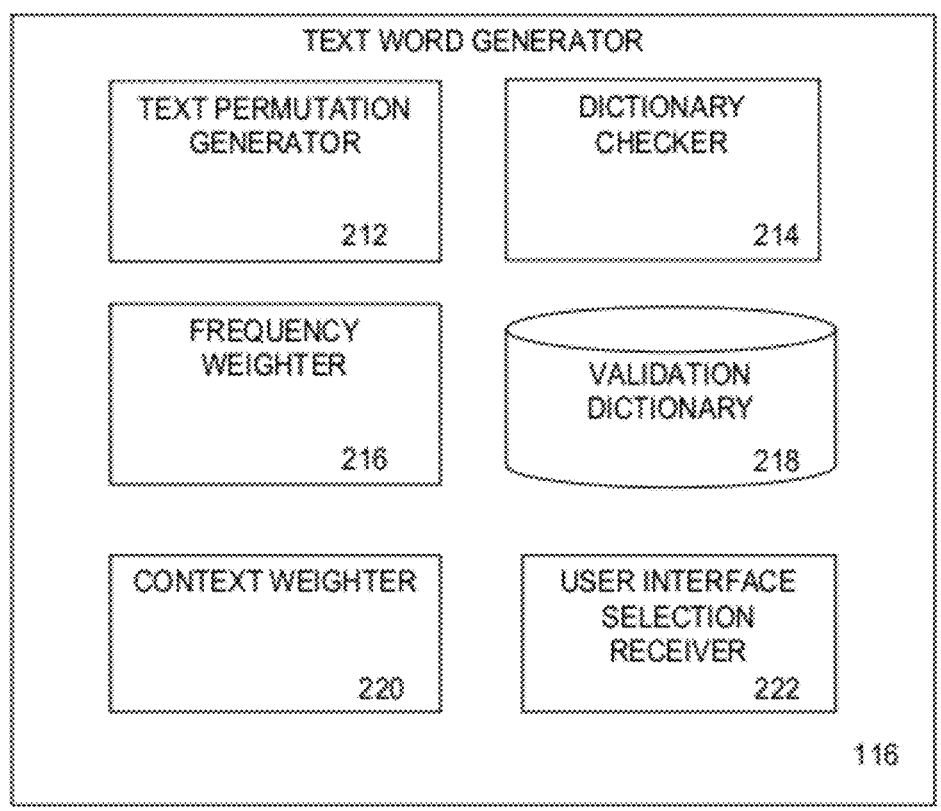
FIG. 2 is a diagram of a text word generator, according to an embodiment.

FIG. 2 shows text word generator 116, according to an embodiment. Text word generator 116 may include text permutation generator 212, dictionary checker 214, frequency weighter 216, validation dictionary 218, context weighter 220 and user interface selection receiver 222. Determined text characters may be used by text permutation generator 212 to generate, anew or by recall, combinations or permutations of text character combinations, some of which may potentially be the text word the user is attempting to generate. Whenever there are words with repeated alphabets, text permutation generator 212 may automatically consider all the variations for its predictions. For example, "zoo" would automatically be spelled by a user flicking 'z' and 'o'. Text permutation generator 212 may also take into account that a user is spelling a single text word using multiple flicking sequences. For example, "sequence" could be generated by flicking "seq" in the first flick and then "nce" in a second flick. Note that in most cases, not all of the characters of a word need to be touched or flicked to generate the text word.

Text character combinations are checked against validation dictionary 218 by dictionary checker 214. Validation dictionary 218 may be or may be stored in a memory, data structure or form of memory storage that includes valid text words and new words added by a user or another data source. In some cases, validation dictionary 218 and dictionary checker 214 may be combined into a single component. In other embodiments, various other methods known in the art of text entry may be used to select or filter for potential words. Potential text words are chosen for entry or selection.

If the confidence of a potential text word is high or above a threshold then the word would be directly entered. Alternatively, a set of choices would be presented to the user for selection. Potential text words may be weighted by frequency weighter 216 based on a frequency of use, according to an embodiment. A weight may be preassigned to a number of potential words based on a generally expected frequency of usage. Frequency weighter 216 may adjust a weight for a potential word based on a frequency of use by a user. For example, a new text word name may be entered anew by a user and used more frequently than a preloaded dictionary text word that is formed by similar text characters. The weight of the more frequently used new word would become greater than that of the similar preloaded text word. The new word would be presented to the user more frequently or entered automatically. Over time, a user could learn patterns for familiar words and be able to touch type entire words in one motion.

Context weighter 220 may adjust a weight of a potential word based on the context of the potential word or words previously used, according to another embodiment. For example, certain potential words may be expected based on words used in earlier in a sentence or paragraph. Text word generator 116 may also learn from words that a user spells and improve its ability to predict text words a user is expecting.

Figure 3:
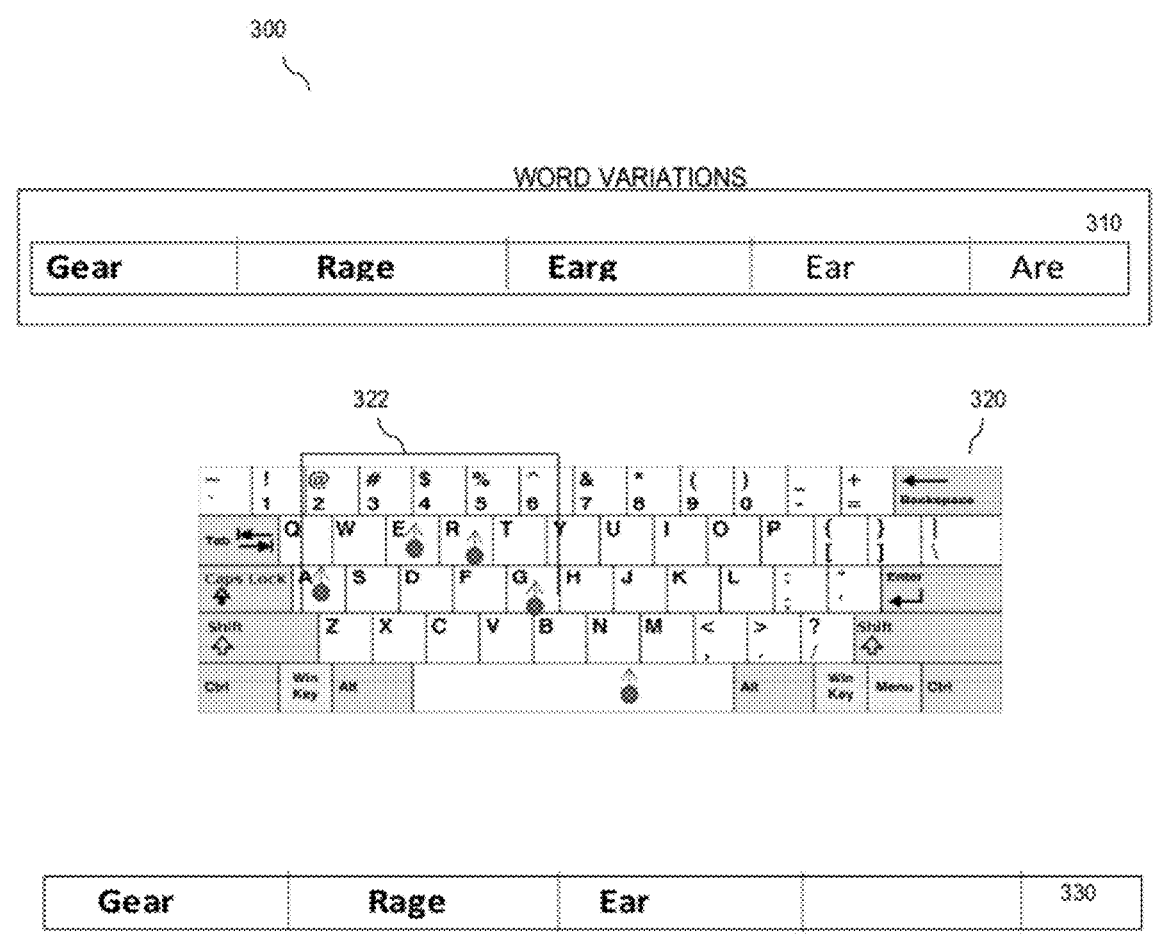

FIG. 3 illustrates an example 300 of using multiple simultaneous touchpoints for text input, according to an embodiment. On-screen keyboard 320 is shown with 4 text characters (letters "A", "E", "R" and "G") being touched and flicked upwards in motion 322. On-screen input detector 112 and slide detector 114 may determine the text characters selected. Text word generator 116 may consider a number of word variations 310 generated from the detected text characters touched in motion 322. Certain words may be filtered out based on potential word weights or for other reasons, leaving fewer potential words 330. In some cases, a touch of the space bar may be used to signify the end of a motion for a text word. In other cases, a space or separator would not be needed or would be inserted automatically based on a determination of a text word.

According to a further embodiment, a user may select a text word from a small offering of potential text words. For instance, user interface selection receiver 222 may receive the selection "Gear" from the displayed choices of "Gear", "Rage" and "Ear." The word "Gear" may then be entered into the text string.

Figure 4:
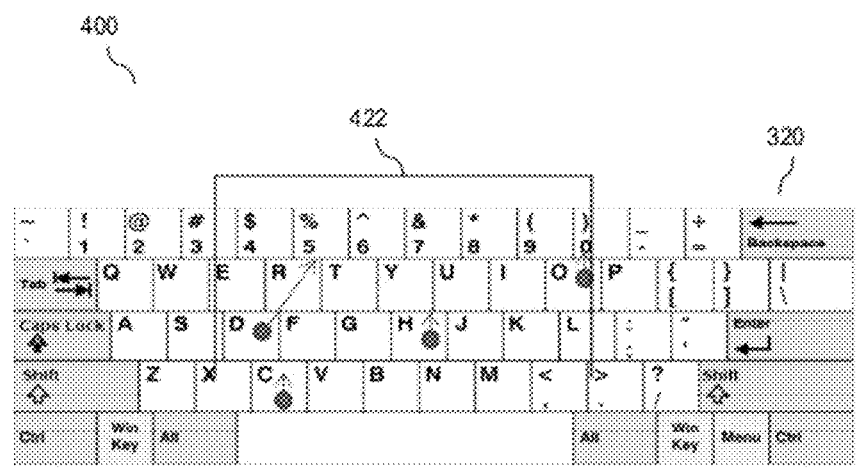
FIG. 4 illustrates text input using multiple touchpoints, according to an embodiment.
Figure 4:
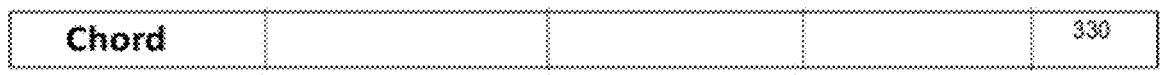

FIG. 4 illustrates another example 400 of using multiple touchpoints for text input, according to an embodiment. A motion 422 is detected, where letters "C", "D", "H" and "O" are determined to have been selected. In some cases, a text character, such as "R", may be selected by a slide or brush across the letter. In other cases, a text character may be selected in an automatic correction action when a touch may have missed the targeted key and instead selected a neighboring key. In selection box 330, the word "Chord" is generated. If the weight or confidence is high, or no other reasonable potential words would be generated based on the letter combinations, the word "Chord" would then be automatically entered as the text word. According to another embodiment, not all of the letters of a text word may have to be selected. In such an example, letters "C", "D", "H" and "O" may be touched or flicked simultaneously to form "Chord," without the letter "R" being touched or flicked.

Figure 5:
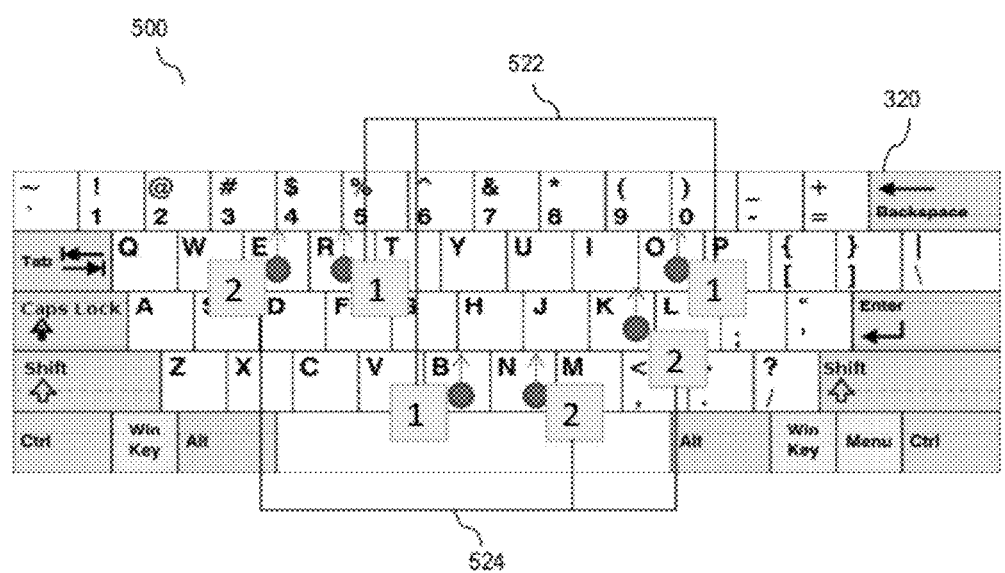
FIG. 5 illustrates text input using multiple touchpoints, according to an embodiment.

FIG. 5 illustrates another example 500 of motions to enter a text word, according to an embodiment. In this example, a first motion 522 involves a flick of letters "B", "R" and "O" simultaneously. In a second motion 524, "E", "N" and "K" are simultaneously flicked. Text generator 116 may generated and enter the single word "Broken."

Figure 6:
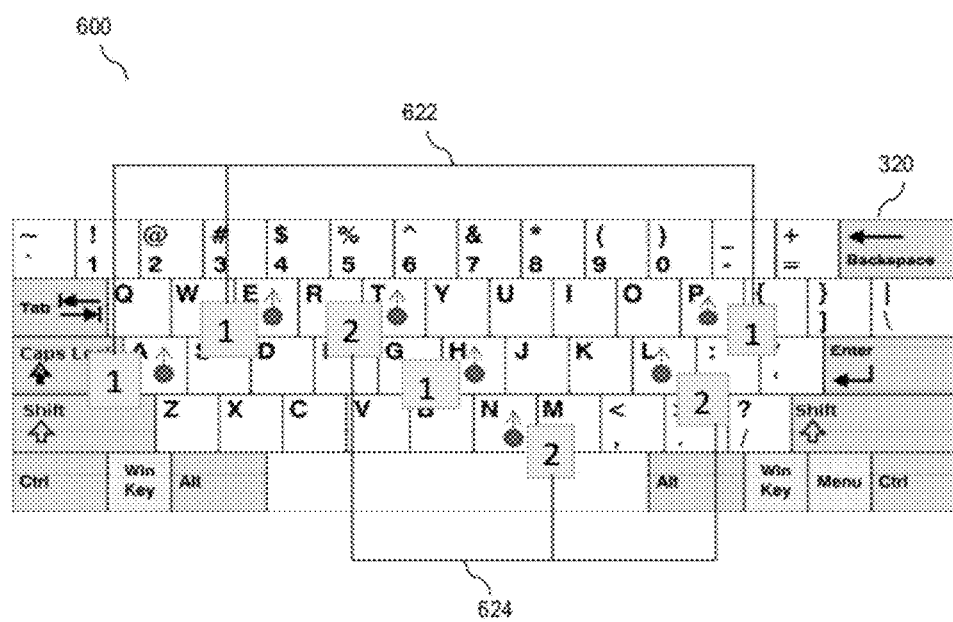
FIG. 6 illustrates text input using multiple touchpoints, according to an embodiment.
Figure 6:
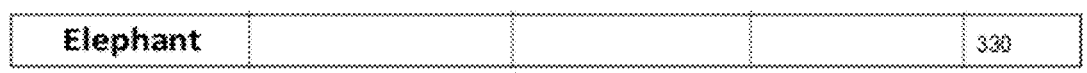

FIG. 6 illustrates an example 600 of motions to enter a text word, according to an embodiment. A first motion 622 flicks letters "A", "E", "H" and "P" and a second motion 624 flicks letters "T", "N" and "L". In box 330, the word "Elephant" is generated. Notice that not all of the letters of the text word are touched. For instance, "E" is selected once but appears twice in the word. Not all letters need be selected to form a text word. Also, the letters need not be selected in any particular order. Text word generator 116 may take a set of letters and determine, based on potential combinations and known valid words, a text word that a user has intended to enter. In this case, a word requiring 8 or 9 separate motions with conventional on-screen typing methods ("elephant") may require as few as 1 or 2 motions to generate the same word, which is a large increase in efficiency.

Figure 7:
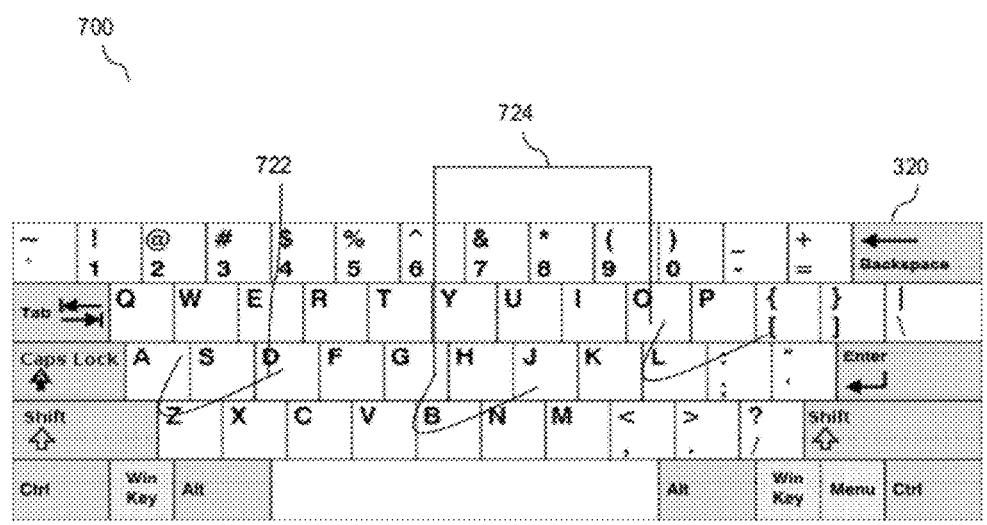
FIG. 7 illustrates text input using gestures, according to an embodiment.

FIG. 7 illustrates a gesture 722 that may be created to enter text, according to an embodiment. In this example 700, gesture 722 is a motion, such as a writing or painting motion, that brushes letters "A" and "D" but is recognized to mean "and". Such gestures may be used in combination with simultaneous multiple touchpoints to determine certain common and frequently used words, especially words that require traversing opposite ends of the keyboard. Such gestures may also be made with multiple touchpoints where the direction, pattern and speed of a slide are received by slide detector 114 and used by text word generator 116 to generate a text word.

Different directions or patterns while touching the same letters may indicate different text words, respectively, according to a further embodiment. For example, flicking "G" and "O" could mean entering the word "go." However, a hooking gesture 724 with simultaneous touchpoints on "G" and "O" could generate the word "Google." In other examples, simultaneous multiple touchpoint gestures do not necessarily have to start on text characters of the word and could just be performed anywhere on the on-screen keyboard. Different shortcut words may be detected based upon a number of touchpoints, positions of the touchpoints and the pattern of the gesture.

Figure 8:
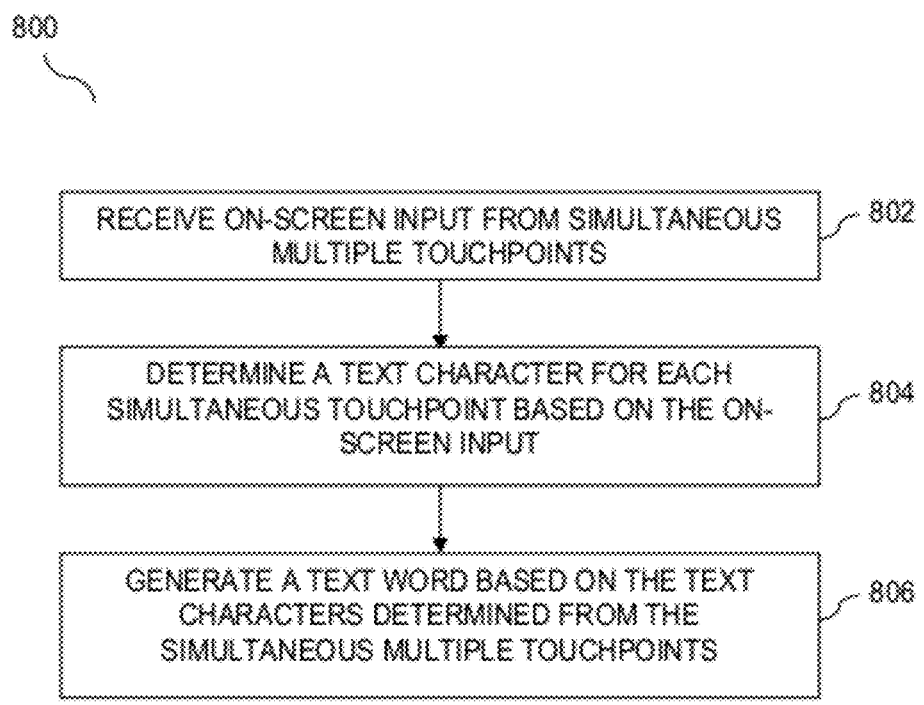
FIG. 8 is a flowchart of a method for using multiple touchpoints on an on-screen keyboard for text entry.

FIG. 8 shows a flowchart of a method for using multiple simultaneous touchpoints to enter text, according to an embodiment. In step 802, on-screen input from multiple simultaneous touchpoints are received. In step 804, a text character is determined for each simultaneous touchpoint based on the on-screen input. In some cases, a text character may be determined based on a slide indication. In step 806, a text word is generated based on the text characters determined from the simultaneous multiple touchpoints. This text word may be provided automatically based on a determination that it is most likely the only text word that the user was intending to enter. The entered text word may be a user selection from a list of potential text words generated by text word generator 116. Steps 802-804 may be performed with, or with portions of systems 100 and 200, as explained above.

Computing devices, touch screens and on-screen keyboards may be redesigned for easier use of multiple simultaneous touchpoints, according to embodiments. For example, devices may be configured based on the use of one-hand, two-hands, or with consideration of flicking and gesturing. In some cases, a conventional keyboard may be replaced with a touch sensitive pad that may be used for text entry using multiple simultaneous touchpoints.

Text may be input with fewer overall motions. The embodiments described above are illustrative and are not meant to limit the present invention. These embodiments illustrate methods and systems for text input that are more efficient and can benefit many users. In some cases, users may learn and/or create a large vocabulary of simultaneous multiple touchpoint motions for quicker text input.

Aspects of the embodiments for exemplary systems 100-700, and/or method 800 or any part(s) or function(s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   receiving, at a computing device, an indication of a first plurality of touch inputs, the first plurality of touch inputs being entered simultaneously at a corresponding first plurality of locations of a touchscreen operatively coupled to the computing device, the first plurality of locations being associated with a first plurality of respective characters of a virtual keyboard;
   determining, by the computing device, based on the indication of the first plurality of touch inputs, a first plurality of text characters that includes respective text characters determined based on each respective location of the first plurality of locations of the touchscreen;
   receiving, at the computing device, an indication of a second plurality of touch inputs, the second plurality of touch inputs being entered simultaneously at a corresponding second plurality of locations of the touchscreen associated with a second plurality of respective characters of the virtual keyboard;
   determining, by the computing device, based on the indication of the second plurality of touch inputs, a second plurality of text characters that includes respective text characters determined based on each respective location of the second plurality of locations of the touchscreen; and
   outputting, by the computing device, for display, a word based on the first plurality of text characters and the second plurality of text characters, wherein the first plurality of text characters and second plurality of text characters do not include all characters of the word.

2. The method of claim 1, further comprising:
   receiving, at the computing device, an indication of a slide input at the first plurality of locations, wherein the determining includes determining a text character for each respective location of the first plurality of locations based on the indication of the first plurality of simultaneous touch inputs and the indication of the slide input.

3. The method of claim 1, further comprising:
   receiving, at the computing device, an indication of a second slide input at the second plurality of locations, wherein the determining includes determining a text character for each respective location of the second plurality of locations based on the indication of the second plurality of simultaneous touch inputs and the indication of the second slide input.

4. The method of claim 1, further comprising:
   receiving, at the computing device, an indication of a touch gesture, wherein the touch gesture is written across multiple virtual keys of the virtual keyboard; and
   determining, by the computing device, a second word based on the indication of the touch gesture.

5. The method of claim 1, further comprising:
   generating by the computing device, based on the plurality of text characters, a plurality of letter combinations;
   selecting, by the computing device, based on a validation dictionary, a plurality of potential words from the plurality of letter combinations;
   weighting, by the computing device, based on a frequency of word use and previous word use, each potential word of the plurality of potential words based; and
   outputting, for display, the potential words based on the weighting.

6. The method of claim 5, further comprising outputting, by the computing device, for display, a provided potential word having the greatest weighting.

7. The method of claim 5, further comprising:
   outputting, by the computing device, for display, the provided potential words; and
   generating, by the computing device, the word based on a user selection of a potential word from the displayed potential words.

8. The method of claim 1, wherein the generating further includes generating the word without receiving the first character of the word.

9. A system, comprising:
   at least one processor;
   a touch input device operatively coupled to the at least one processor; and
   a memory device operatively coupled to the at least one processor and storing instructions that, when executed by the one or more processors, cause a computing device to:
   receive an indication of a first plurality of touch inputs, the first plurality of touch inputs being entered simultaneously at a corresponding first plurality of locations of the touch input device associated with a first plurality of respective characters of a virtual keyboard;
   determine, based on the indication of the first plurality of touch inputs, a first plurality of text characters that includes respective text characters determined based on each respective location of the first plurality of locations of the touch input device;
   receive an indication of a second plurality of touch inputs, the second plurality of touch inputs being entered simultaneously at a corresponding second plurality of locations of the touch input device associated with a second plurality of respective characters of the virtual keyboard;
   determine, based on the indication of the second plurality of touch inputs, a second plurality of text characters that includes respective text characters determined based on each respective location of the second plurality of locations of the touch input device; and
   output, for display, a word based on the first plurality of text characters and the second plurality of text characters, wherein the first plurality of text characters and second plurality of text characters do not include all characters of the word.

10. The system of claim 9, further comprising:
a slide detector configured to receive an indication of a slide input at the first plurality of locations, wherein a word generator is configured to determine a text character for each respective location of the plurality of first plurality of locations based on the indication of the first plurality of simultaneous touch inputs and the indication of the slide input.

11. The system of claim 9, wherein the slide detector is further configured to:
receive an indication of a second slide input at the second plurality of locations, and
wherein the word generator is further configured to determine a text character for each respective location of the second plurality of locations based on the indication of the second plurality of simultaneous touch inputs and the indication of the second slide input indication of the second plurality of simultaneous touchpoints.

12. The system of claim 9, wherein the touch input receiver is further configured to receive an indication of a touch gesture, wherein the touch gesture is written across multiple virtual keys of the virtual keyboard, and wherein the word generator is further configured to determine a second word based on the indication of the touch gesture.

13. The system of claim 9, wherein the stored instructions, when executed by the at least one processor, further cause the computing device to:
generate a plurality of letter combinations based on the plurality of text characters;
select a plurality of potential words from the plurality of letter combinations based on a validation dictionary;
weight each potential word of the plurality of potential words based on a frequency of use; and
output, for display, the potential words based on the weighting.

14. The system of claim 13, further comprising a context weighter configured to weight each potential word of the plurality of potential words based on previous words.

15. The system of claim 13, wherein the word generator is further configured to provide a potential word having the greatest weight for display.

16. The system of claim 9, further comprising a user interface selection receiver configured to receive a user selection, wherein the word generator is further configured to output, for display, the provided potential words and generate the sword based on a user selection of a displayed potential word.

17. A non-transitory computer-readable medium storing instructions that, when executed by at least one processor, cause a computing device to:
receive an indication of a first plurality of touch inputs, the first plurality of touch inputs being entered simultaneously at a corresponding first plurality of locations of a touchscreen operatively coupled to the computing device, the first plurality of locations being associated with a first plurality of respective characters of a virtual keyboard;
determine, based on the indication of the first plurality of touch inputs, a first plurality of text characters that includes respective text characters determined based on each respective location of the first plurality of locations of the touchscreen;
receive an indication of a second plurality of touch inputs, the second plurality of touch inputs being entered simultaneously at a corresponding second plurality of locations of the touchscreen associated with a second plurality of respective characters of the virtual keyboard;
determine, based on the indication of the second plurality of touch inputs, a second plurality of text characters that includes respective text characters determined based on each respective location of the second plurality of locations of the touchscreen; and
output, for display, a word based on the first plurality of text characters and the second plurality of text characters, wherein the first plurality of text characters and second plurality of text characters do not include all characters of the word.

* * * * *